United States Patent [19]
Kiel

[11] 3,722,595
[45] Mar. 27, 1973

[54] HYDRAULIC FRACTURING METHOD

[75] Inventor: Othar M. Kiel, Houston, Tex.

[73] Assignee: Esso Production Research Company, Houston, Tex.

[22] Filed: Jan. 25, 1971

[21] Appl. No.: 109,415

Related U.S. Application Data

[63] Continuation-in-part of Ser. No. 76,887, Sept. 30, 1970, abandoned.

[52] U.S. Cl..................................166/308, 166/75
[51] Int. Cl. ..............................................E21b 43/26
[58] Field of Search........166/308, 283, 281, 246, 75, 166/177, 305 R; 252/8.55 R

[56] References Cited

UNITED STATES PATENTS

| | | | |
|---|---|---|---|
| 2,876,839 | 3/1959 | Fast et al. | 166/283 |
| 3,378,074 | 4/1968 | Kiel | 166/308 |
| 2,801,218 | 7/1957 | Menanl | 252/8.55 R |
| 3,405,062 | 10/1968 | Kuhn | 166/283 X |
| 3,552,494 | 1/1971 | Kiel | 166/308 |
| 3,305,016 | 2/1967 | Lindblom et al. | 166/246 |

*Primary Examiner*—Stephen J. Novosad
*Attorney*—James A. Reilly, John B. Davidson, Lewis H. Eatherton, James E. Gilchrist, Robert L. Graham and James E. Reed

[57] ABSTRACT

A fracturing method wherein an emulsified fluid is injected into a subterranean formation under sufficient pressure to open a fracture in the formation. The fracturing method is performed by continuously passing the liquid used as the external phase through a conduit to establish a turbulent flow stream, introducing the liquid used as the internal phase into the flow stream at a plurality of locations to progressively increase the concentration of the internal phase, and continuously injecting the emulsion into the formation under sufficient pressure to open a fracture therein. The method can be employed in water external or oil external systems.

9 Claims, 1 Drawing Figure

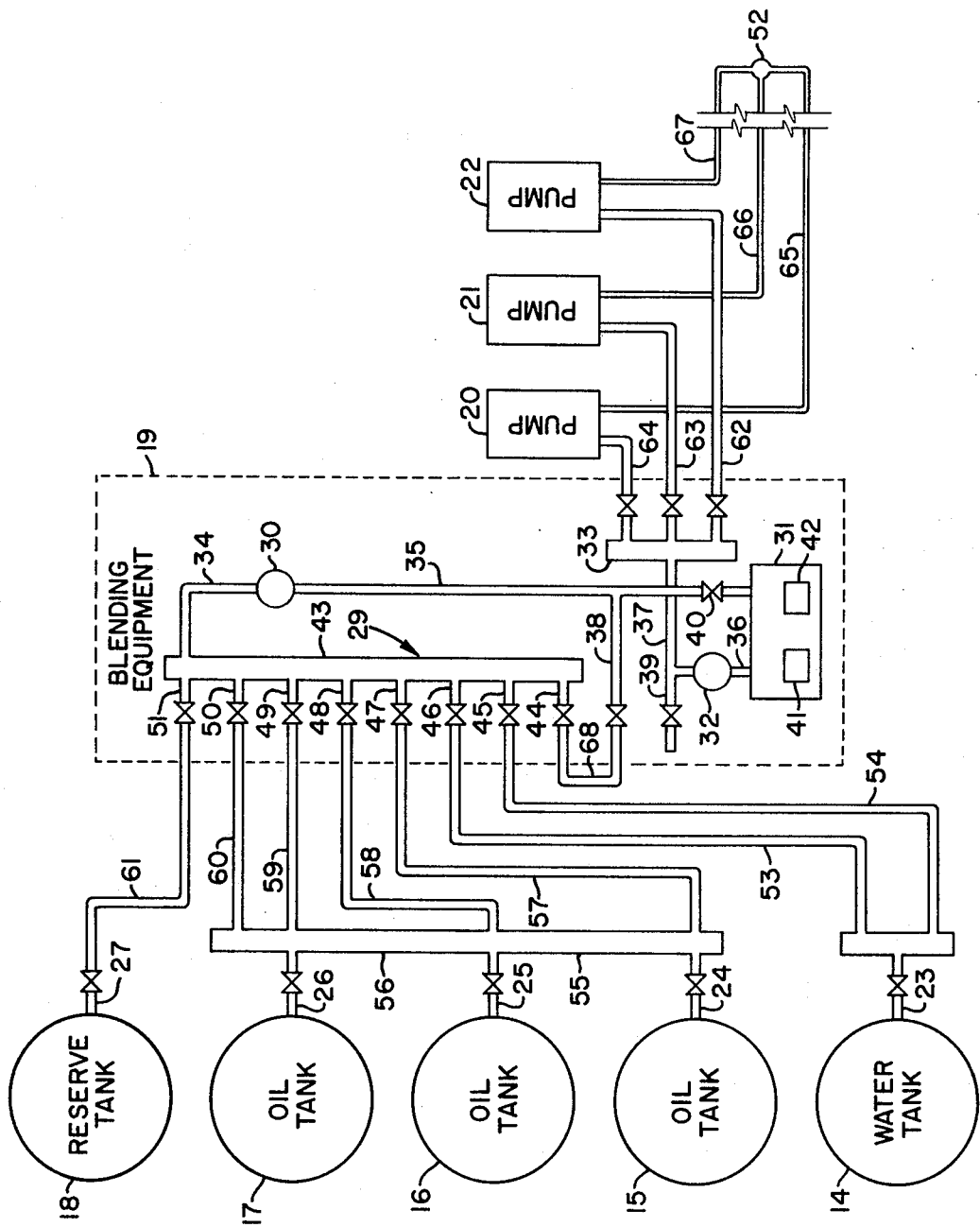
PATENTED MAR 27 1973　　3,722,595
INVENTOR.
OTHAR M. KIEL
BY Robert L. Graham
ATTORNEY 3,722,595

HYDRAULIC FRACTURING METHOD

CROSS-REFERENCE TO RELATED APPLICATION

This application is a continuation-in-part of application Ser. No. 76,887, filed in the United States Patent Office on Sept. 30, 1970 and now abandoned.

BACKGROUND OF THE INVENTION

1. Field of the Invention:

This invention relates to the hydraulic fracturing of subterranean formations surrounding oil wells, gas wells, water wells, injection wells and similar boreholes.

2. Description of the Prior Art:

Hydraulic fracturing is a widely used well stimulation technique designed to increase the productivity of a well by creating fractures in the formation surrounding the wellbore. The technique normally involves two basic steps: (1) injecting a fluid into the formation at a rate and pressure sufficient to propagate a fracture adjacent the wellbore and (2) placing propping agent particles in the fracture to maintain it in a propped condition when the applied pressure is relieved.

During the propagation step of the treatment, the fracturing fluid must have properties which provide the proper wedging effect for creating a fracture of the desired geometry. These properties relate to the fluid loss characteristic and the viscosity of the fluid employed as the fracturing medium.

It has long been known that the fluid efficiency of the fracturing fluid must be high if fractures of reasonable lengths and widths are to be obtained. Fluid efficiency, as used in fracturing operations, is defined as the percent of injected fluid which remains within the fracture, and is a measure of the fluid loss characteristic of the fluid. Many fluids tend to leak off rapidly into the formation matrix and therefore provide low fluid efficiencies. The fluid efficiency can be improved by the addition of fluid loss control additives, which are generally finely divided materials such as silica flour, talc, calcium carbonate, and the like.

More recently, the effect of fluid viscosity on fracture geometry has received considerable attention. It has been found that the viscosity of the fluid passing through the fracture plays a major role in developing pressure for opening the fracture. Although the phenomenon is not fully understood, tests indicate that the high friction loss associated with the high viscosity fluids results in large pressures within the fracture which tend to force the fracture walls farther apart.

Another important consideration in the design of fracturing fluid is the effect of the fluid on friction loss. The wedging effect described above must be achieved without excessive friction loss in the well conduit leading to the formation. High friction loss in the well conduit limits the available power deliverable to the formation and/or increases the pressure requirements of injection facilities.

During the proppant placement phase of the treatment, the fracturing fluid acts as a carrier for the propping agent particles. Thus the fluid must be capable of suspending large concentrations of particles for long transport distances. The trend toward the use of large propping agent particles has increased the importance of the suspension quality of the fluid.

Finally, the fracturing fluid should not damage the formation. This generally means that the fluid at formation conditions must possess sufficient mobility in the formation matrix and the propped fracture to be producible into the wellbore along with formation fluids. This operation is referred to as well clean-up.

The characteristics of an ideal fracturing fluid, then, can be summarized as follows: low friction loss in the well conduit; low fluid loss; high friction loss in the fracture; good proppant suspension capability; and easily produced from the formation and fracture.

As disclosed in copending application Ser. No. 76,887, emulsions can be formulated to satisfy most of the requirements of the ideal fracturing fluid. These emulsions generally contain a major volume proportion of an internal phase and a minor volume proportion of an external phase. The high concentration of the internal phase imparts a non-Newtonian flow character to the fluid and increases its apparent viscosity. The non-Newtonian fluid character reduces the friction loss in the well conduit while the high apparent viscosity provides good proppant suspension quality to the fluid and permits the development of high pressure in the fracture. The emulsified fluid, if properly formulated, also permits rapid well clean-up following the treatment.

Experience has shown, however, that emulsions containing high concentrations of an internal phase are difficult to promote and stabilize, particularly when employing conventional oil-field blending equipment. In the past, emulsified fracturing fluids have generally been prepared by batch process or a continuous process. The batch process involves introducing the fluid components and additives into a single container and agitating the contents of the container until a uniform dispersion is obtained. This process is time consuming and frequently requires additional tanks for storing the emulsion.

The continuous process involves blending the fluid components together and injecting the blend into the formation to be treated in a continuous operation. While the continuous process expedites the fracturing operation, it generally has required the use of specially constructed agitators and blenders designed for intermixing the fluid components. The agitators and blenders add to the complexity of the system and increase the cost of the treatment.

SUMMARY OF THE INVENTION

The present invention contemplates an improved method for continuously preparing an emulsion and injecting the same into the formation. The method has particular advantageous applications in treatments which employ emulsions containing high concentrations of an internal phase. Surprisingly, it has been found that by passing the liquid used as the external phase through an elongate conduit to establish a turbulent flow stream and introducing the liquid used as the internal phase into the stream at a plurality of locations spaced therealong, a stable emulsion can be formed without the use of special agitators or blenders. It is believed that by progressively increasing the concentration of the internal phase in this manner, less energy is required to form a uniform and stable composition. The emulsion can be continuously withdrawn from the conduit and continuously injected through the wellbore and into the formation, thus bypassing storage. Volumetric control is provided by carefully maintaining the liquid levels of the tanks equal so that the liquid streams discharging from their respective tanks are in proportion to the liquid volumes contained therein. A particularly advantageous feature of the method is that it permits preparation of the emulsion and injection of the same into the formation in a continuous process using conventional oil field fracturing equipment; that is, no special agitators or blenders are required.

BRIEF DESCRIPTION OF THE DRAWING

The drawing is a schematic representation of the apparatus capable of performing the method of the present invention.

DESCRIPTION OF THE PREFERRED EMBODIMENTS

The fracturing method of the present invention can be characterized as a continuous process for preparing an emulsified fracturing fluid and injecting the same into a subterranean formation. The method will be described in connection with an oil-in-water emulsion but it should be observed that the method can also be applied in water-in-oil emulsions.

An emulsion usable in the present invention can have the composition of that disclosed in copending application Ser. No. 76,887. The oil-in-water emulsion was described therein as containing greater than 50 and less than 90 volume percent of an external water phase which has dissolved or dispersed therein a polymeric thickening agent. The thickening agent and high concentration of internal phase coact to give the emulsion a relatively high apparent viscosity, which, as mentioned earlier, improves fluid efficiency and increases the proppant suspension quality of the fluid.

The fracturing fluid can be formulated from four basic ingredients; an aqueous liquid providing the external water phase; hydrocarbon oil providing the internal oil phase, an emulsifier for promoting and stabilizing the emulsion, and a water-soluble polymeric thickening agent for building viscosity of the water phase. It should again be emphasized that the present invention is not restricted to this particular fracturing fluid. The method can be advantageously employed in any fracturing operation wherein the internal phase comprises greater than 50% of the emulsion. Details of the composition of the emulsified fluid in this embodiment are presented merely for illustrating the present invention.

Choice of the aqueous and hydrocarbon liquids will generally be governed by the availability of the liquids involved. When employing anionic or cationic emulsifiers which are sensitive to the presence of divalent ions, fresh water should generally be used. However, hard water or brine, if properly treated with water-softening chemicals, such as trisodium phosphate or hexametaphosphate, can be employed. Public water supply, if available, can be used with the sensitive emulsifiers. This water, however, should be tested for hardness and softened, if necessary. For each grain of hardness per gallon of water, about one pound of trisodium phosphate or 1-¼ pound of hexametaphosphate per 100 barrels of water can be used to soften the water. As a general rule, the nonionic emulsifying agents are not sensitive to the divalent ions and therefore can be used in hard water or brine as well as soft water.

The hydrocarbon oil can be crude oil or virgin or refined fractions such as kerosene, gasoline, diesel oil, gas oil, and the like. Low viscosity hydrocarbons are preferred because they are easier to remove from the formation following the treatment. Gas condensate, if available, can also be used and offers the additional advantage of rapid well clean-up. Condensate is a light (API gravity greater than 50) and volatile liquid comprising the condensable hydrocarbon fractions produced from a gas or a gas condensate well. The major portion of these fractions generally include $C_7 - C_{16}$ hydrocarbons. In the reservoir, the condensable hydrocarbon fractions, or at least a portion thereof, are in the gaseous state but at surface conditions they condense to form a liquid which is separated from the gas and collected in suitable surface facilities. The condensate constituting the internal phase of the emulsion will retain its liquid character as long as the fracturing pressure is maintained on the emulsion. However, when the applied pressure is removed and the well is placed on production, the dispersed condensate particles in the fracture will be vaporized as formation gas commingles with the emulsion or emulsion phases. Vaporization of the condensate not only breaks the emulsion but transforms the oil phase of the fracturing fluid into a highly mobile gas. This permits rapid well clean-up, particularly for gas or condensate walls.

The selection of the most efficient emulsifier and its concentration in the water phase will depend upon several factors, including the composition of the oil and water to be emulsified, the temperature of the formation to be treated, the type of blending equipment available, and the composition of the additives to be employed in the emulsion. The most efficient emulsifier or blends for a particular system may require a selection by a trial-and-error process. The trial-and-error selection can be aided and guided by the familiar hydrophile-lipophile-balance (HLB) method. Emulsifiers or blends of emulsifiers having HLB numbers in the range from 8 to 18 are generally considered oil-in-water emulsifiers. See Emulsions: Theory and Practice, by Becher, and published by Reinhold Publishing Corporation, New York, U.S.A., copyright 1957, for a detailed explanation of the HLB method and for a list of emulsifiers and corresponding HLB numbers.

As indicated earlier, the emulsifier may be an anionic, cationic, or nonionic surfactant. Suitable anionic emulsifiers include the alkali, amine, and other fatty acid soaps. As is well known in the emulsion art, these soaps are the salts of long-chain fatty acids derived from naturally-occurring fats and oils. The mixed fatty acids of tallow, coconut oil, palm oil, and the like are the most commonly employed. Other sources of carboxylic acids include tall oil and rosin. Many of the fatty acid soaps such as the alkali and amine soaps have the added advantage in the contemplated fracturing service of being neutralized in the presence of divalent ions. When the emulsion comes in contact with connate water of the formation, the calcium or magnesium ions, which are almost always present in the connate water, neutralize the emulsifier and break the emulsion. This returns the oil and water components to their original demulsified viscosities which are much lower than the emulsion viscosity. When the well is placed on production, the water and oil are then easily flushed from the formation.

When using the alkali and amine soaps, it is usually necessary to operate with soft water because these soaps are sensitive to divalent ions such as calcium. The water available at the well site generally will require treatment with a water softening chemical such as one of the complex phosphates, sodium carbonate or a chelating agent.

The soaps are generally made in situ by adding the fatty acid and a base to the water phase prior to blending the two phases together. Alternatively, the fatty acid can be dissolved in the oil phase and the base in the water phase. The soap forms at the interface as the two phases are brought together. Suitable bases for the preparation of alkaline soaps include sodium hydroxide and potassium hydroxide. Suitable bases for forming the amine soap can be selected from a wide variety of amines such as triethanolamine, morpholine, and 2-amino-2-methyl 1,3-propanediol. Ammonium hydroxide when added in small concentrations to the oil phase of the amine or alkali systems described above appears to improve the stability of the emulsion. Laboratory experiments have shown that when the water phase containing an emulsifier and the oil phase containing the ammonium hydroxide are brought together, a more stable emulsion is formed than in the same system without the ammonium hydroxide. The concentration of the ammonium hydroxide can be from about 0.01 to about 0.10 volume percent based on the volume of the oil, with about 0.05 volume percent being preferred.

Although the cationic emulsifying agents are not widely used for promoting oil-in-water emulsions, some exhibit high HLB numbers indicating that they can be employed for this service. The cationic emulsifying agents of principal importance are the amines and quaternary ammonium salts such as polyoxyethylene sorbitol oleate-polyoxyethylene amine blend, polyoxyethylene alkyl amine, quaternary ammonium derivative, and N-cetyl N-ethyl morpholinium ethosulfate.

The nonionic emulsifying agents are generally independent of water hardness and pH and therefore are compatible with hard water or brine. A few of the general purpose nonionic emulsifiers capable of promoting stable oil-in-water emulsions include polyoxyethylene sorbitan monolaurate, polyoxyethylene lauryl ether, polyoxyethylene monostearate, polyoxyethylene oxypropylene stearate, polyoxyethylene cetyl ether, polyoxyethylene sorbitan esters of mixed fatty and resin acids, polyoxyethylene glycol monopalmitate, and polyoxyethylene sorbitan monopalmitate.

The concentration of the emulsifying agent in the water will depend upon a multitude of factors. The optimum concentration for a particular system will generally be determined on a trial-and-error basis. Concentrations between about 0.1 weight percent and about 3.0 weight percent of the emulsifying agent based on the weight of the aqueous phase should be satisfactory for most applications.

As mentioned previously, many of the polymeric thickening agents which possess surface active properties can be used as the emulsifier to promote the oil-in-water emulsion. The carboxyvinyl polymers are representative of this group. Polyvinylcarboxylic acid neutralized with a long-chain amine and a common base is capable of promoting extremely stable oil-in-water emulsions. The emulsified system exhibits excellent temperature resistance and therefore can be used in deep, high-temperature wells.

The polymeric thickening agent can be any one of a variety of long-chain, water-soluble polymers capable of building the viscosity of an aqueous solution. These polymers are commonly referred to as gums. Synthetic and modified polymers and natural gums can be used. The synthetic and modified polymers include the acrylic polymers such as polyacrylamide and polyacrylic acid; the vinyl polymers such as polyvinylpyrrolidone and polyvinylcarboxylic acid neutralized with a long-chain amine and a common base; and the cellulose derivatives such as sodium carboxymethyl-cellulose, sodium carboxymethylhydroxyethylcellulose, methylcellulose, hydroxyethylcellulose, and ethylhydroxyethylcellulose.

The natural gums include guar gum, gum arabic, gum tragacanth, gum karaya, and the like. Also usable are the microbial fermentation gums such as dextran and the heteropolysaccharides produced by the bacteria of the genus Xanthomonas. In some applications, it may be desirable to use a blend of natural and synthetic polymers, since their respective chemical effects on the emulsion may be different. For example, many of the natural gums operate to form protective colloids on the dispersed oil particles, as well as thickening the water phase of the emulsion. Many of the natural gums also are more effective in controlling the fluid loss of the fluid than are the synthetic polymers. In selecting the polymeric thickening agent and the emulsifying agent for a particular system, care must be exercised to insure the chemicals are compatible.

The concentration of the polymeric thickening agent in the water phase will depend upon the effectiveness of the material used and the apparent viscosity desired. Laboratory tests have shown that the thickening effect of the polymer is generally a function of the concentration of the polymer in the water. The concentration of the polymer should be sufficient to provide the water with an apparent viscosity between about 10 and about 200 centipoises at 70° F and a shear rate of 511 reciprocal seconds. Polymer concentrations between about 0.1 and 1.0 weight percent of the water are sufficient for most applications.

When a polymer is incorporated in the external phase of an emulsion wherein the internal oil phase represents the major volume proportion, a second thickening mechanism becomes involved. This second mechanism, which apparently results from a crowding of the dispersed oil particles, has a pronounced coacting relationship with the first mechanism when the oil phase comprises greater than 50 volume percent of the emulsion. As discussed in copending application, Ser. No. 76,887, the preferred concentration of the internal phase is between 60 and 80 volume percent. Volume percent less than 60 percent does not have an appreciable effect on emulsion viscosity and concentrations greater than 80 volume percent are difficult to handle.

Additional additives that may be employed in the fracturing fluid include fluid loss control additives such as silica flour, lime, talc, and the like. The concentration of the fluid loss control additive will depend in part on the inherent fluid loss characteristics of the emulsion. For many highly viscous liquids, the filter loss characteristics of the fluid are low and only small amounts of the fluid loss control additives are required to obtain the desired fluid loss characteristic. Additional additives can include slow-acting demulsifying agents for breaking the emulsion and chemicals for degrading the polymeric thickening agent. These materials may be required in certain systems to transform the viscous emulsion to a demulsified, low viscosity state for promoting well clean-up. In some systems, it may prove satisfactory to merely degrade the polymer. The emulsion without the polymer may have sufficient mobility to permit rapid well clean-up.

While it is desirable to have a viscous fluid for propagating a long, wide fracture, the fluid should also exhibit low friction loss while flowing through the well conduit. The addition of the polymeric thickening agent to the system reduces the friction loss characteristic of the fluid. Although the mechanisms involved are not fully understood, tests indicate that the polymeric thickening agent acts as a turbulence depressant.

As mentioned above, the fracturing fluids should exhibit high friction loss while flowing through the fracture. When the emulsion used in the present invention enters the fracture, portions of the external water phase leak off into the formation matrix reducing the volume proportion of the water phase. This results in an increased apparent viscosity for the emulsion remaining in the fracture and provides the high pressure loss necessary for obtaining long, wide fractures.

In order to realize the full potential of the stimulation, the fracturing fluid must be removed from the formation matrix and fracture following treatment. Removal of the fracturing fluid, commonly referred to as well clean-up, relies upon the flushing action of the formation fluid flowing into the wellbore. For high permeability wells or high pressure wells, the fracturing fluid used in the present method should not present serious clean-up problems. However, for tight formations or for low pressure formations, it may be desirable to convert the fracturing fluid into a low viscosity fluid in order to promote rapid well clean-up. This can be done in a variety of ways. The polymeric thickening agent can be selected to decompose with time or at formation conditions. A gell breaker can be added to the system to reduce or eliminate the effect of the polymeric thickening agent after sufficient time has elapsed. A slow-acting demulsifying agent can also be added to this system. For example, a water-soluble amine such as diethyl amine can be employed with a nonionic emulsifier such as polyoxyethylene sorbitol monolaurate to produce the desired viscosity reduction after the emulsion has been injected into the formation. These techniques are commonly employed in fracturing operations to decompose the polymer used in gelled water systems or to neutralize the effects of the emulsifier used in the emulsion system. As mentioned above, many of the anionic emulsifying agents are sensitive to divalent ions such as calcium. These ions are almost always present in the connate water of the formation. Use of these anionic emulsifiers produces a system which can be demulsified merely by contacting the fluid with the connate water of the formation. This can be accomplished by producing the formation fluids through the invaded zone whereupon the calcium ions contact and neutralize the anionic emulsifiers. Certain polymers such as polyacrylamide decompose in the presence of divalent ions and therefore can be degraded by the same operation.

In accordance with the present invention, the emulsion is prepared and injected into the well by continuous process. Field experience has shown that this process permits use of conventional oil field equipment. The apparatus for performing the continuous process is shown schematically in the drawing. The apparatus includes a plurality of tanks 14, 15, 16, 17, and 18; blending equipment indicated generally as 19; and a plurality of fracturing pumps 20, 21, and 22. The tanks 14-18 can be 500-barrel steel tanks open to the atmosphere and provided with valved discharge lines 23, 24, 25, 26 and 27, respectively.

The blending equipment which can be truck mounted, includes a suction manifold shown generally as 29, a suction pump 30, a blender tub 31 open to the atmosphere, a discharge pump 32, and a discharge manifold 33. The piping for interconnecting the various components of the blending equipment is as follows: line 34 connects the manifold 29 to the suction of pump 30; line 35 connects the discharge of pump 30 to the inlet of the blender tub 31; line 36 connects the discharge of the blender tub 31 to the suction of pump 32; and line 37 connects the discharge of pump 32 to the manifold 33. Auxiliary lines 38 and 39 which extend, respectively, from the discharge of pump 30 and the discharge of pump 32 can be used to recirculate fluids to the tanks or the manifold 29. If a flow regulator 40 is used to control the flow rate of the fluid entering the blender tub 31, pump 30 can be a centrifugal pump. The flow regulator 40 is generally installed in line 35 downstream of the junction of lines 35 and 38. In this system line 38 can serve as a recirculating line as described below. The blender tub 31 generally is cylindrical in shape having a volumetric capacity between about 5 and 10 barrels. The tub 31 is normally provided with an agitator paddle, hydraulic jets, and top openings 41 and 42 for introducing additives into the fluid system.

The suction manifold 29 comprises a header 43 and a plurality of valved inlets 44, 45, 46, 47, 48, 49, 50, and 51. The inlets are spaced longitudinally along the header 43 and extend laterally therefrom. The header 43 is open; that is, it contains no baffles or agitators, and can be larger in diameter than the inlets 44-51.

The blending equipment described above is generally mounted on a truck chassis as an integrated unit. Units similar to that depicted in the drawing or modifications thereof are available from most well servicing companies.

The fracturing pumps 20, 21, and 22 are normally high pressure, positive displacement triplex pumps driven by diesel engines or turbines and are usually truck mounted.

The tanks, blending equipment, and fracturing pumps are usually delivered to the well site and positioned somewhat in the manner illustrated in the drawing. All of the equipment is normally positioned some distance from the wellhead 52 to minimize danger in case of a fire or blowout.

In accordance with the present invention, the emulsion is continuously prepared and injected into the subterranean formation. The tank containing the liquid used as the external phase is connected to remotely positioned inlets on the manifold 29, and the tanks containing the liquid used as the internal phase are connected to the manifold inlets downstream from the remote inlets. Four-inch flexible hoses can be used for this purpose. In the equipment arrangement shown in the drawing, the water tank 14 is connected to manifold inlets 45 and 46 by hoses 53 and 54. The oil tanks 15, 16, and 17, manifolded together by lines 55 and 56, are connected to inlets 47, 48, 49, and 50 by hoses 57, 58, 59, and 60. A reserve tank 18, if used, can be connected to manifold inlet 51 by hose 61.

The discharge manifold 33 of the blending equipment can be connected in parallel to the suction of the fracturing pumps by hoses 62, 63, and 64. High pressure lines 65, 66, and 67 interconnect the high-pressure pumps and the wellhead 52.

In performing the continuous mixing and injection operation in accordance with the present invention, the external phase is flowed through the header 43 to establish a turbulent flow stream, and the internal phase is introduced into the flow stream at a plurality of locations spaced therealong. The irregular flow path of the external phase flowing through lines 53 and 54 and manifold header 43 imparts a turbulent flow behavior to the fluid which aids in the mixing of the external and internal phases. The internal and external phases pass as a commingled stream successively through pump 30, blender tub 31, pump 32, fracturing pumps 20, 21, and 22, and into the well 52. Field tests have shown that the progressive increase in the concentration of the internal phase in the manner described enables the emulsion to be formed with ease. These tests indicate that the fluids in the tub 31 are uniformly emulsified. The agitation provided by turbulent flow through the lines and the pumping action of pump 30 deliver sufficient energy to uniformly disperse the internal phase in the external phase. Thus, emulsification is achieved using conventional fracturing equipment and requires no special agitators or blenders.

If the blending equipment permits, a portion of the commingled stream passing through line 35 can be diverted through auxiliary line 38 and returned to manifold inlet 44. A hose 68, interconnecting the discharge of auxiliary line 38 to the inlet 44, serves as the return line.

The volumetric control of the liquids used for the external and internal phases can be provided by equalizing the liquid levels in tanks 14–17 prior to commencement of the pumping operations and maintaining the liquid levels about equal during the pumping operations. The volumetric ratio of the external phase and internal phase will then be equal to the ratio of the volume contained in tank 14 and the volume contained in tanks 15–17. The manifold valves on the inlet lines can be manually adjusted to maintain the liquid levels constant. Floats mounted in each tank and connected to external level indicators can guide the operator in making proper valve adjustments during pumping operations.

If a volatile liquid is used as the internal phase, it may be necessary to modify the apparatus to provide a pressurized system. In this event, the volatile liquid can be pumped into the manifold 29 and line 35 can be connected to the discharge manifold 33 bypassing the blender tub 31.

The fracturing method performed by the continuous mixing and injection technique in accordance with the present invention will be described in connection with an oil-in-water emulsion. It should be understood, however, that the same method can be employed using a water-in-oil emulsion.

Initially, the tanks and blending equipment are delivered to the well site and positioned somewhat in the manner depicted in the drawing. The water and oil used in the emulsion are first delivered and transferred to the tanks. Since the internal oil phase will constitute the major volume proportion of the emulsion, one 500-barrel tank will normally be sufficient for containing the water. The number of oil tanks required will depend upon the volume concentration of the internal phase in the emulsion. For an internal phase concentration of 80 volume percent, four 500-barrel oil tanks will be required; for a concentration of 75 volume percent, three 500-barrel oil tanks will be required; for a concentration of 66-⅔ volume percent, two 500-barrel oil tanks will be required. The volumes of liquid delivered to each tank should be in excess of the volume required to perform the fracturing treatment. If 500-barrel tanks are used, an excess volume of about 25 barrels is sufficient. The excess volume prevents the loss of suction during the latter stages of the pumping operations. With the tanks filled, the water-soluble components and the oil-soluble components are admixed with the water and oil, respectively, by utilizing the blending equipment to uniformly disperse the components in their respective liquids.

The water-soluble components will normally include the water-softening chemicals, the emulsifier, and the polymeric thickening agent. Potassium chloride can also be used if the formation to be treated contains water sensitive clays. It has been found expedient to add the water-soluble components in the following order: first, the water-softener (if used); then, the emulsifier; followed by the polymeric thickening agent; and finally, the potassium chloride (if used). Except for the emulsifier, the materials can be introduced into the blender tub 31 while circulating water through the blending equipment. A hose from the auxiliary line 30 to the inlet of the water tank 14, can serve as the return line.

In adding the emulsifier to the water, it is preferred to prepare a concentrated soap solution in the blender tub 31. When using a fatty acid soap as the emulsifier, about 40 gallons of the fatty acid component, e.g. tall oil, can be dissolved in about 5 barrels of water in the tub 31 and neutralized with a base such as sodium hydroxide. This concentrated solution is then flushed from the tub 31 and introduced into tank 14 by circulating water through the blending equipment. Water is circulated from the tank 14 through the blending equipment and back to the tank 14 for several minutes to insure that the soap is thoroughly dispersed in the water. One batch of the concentrated soap solution for each 250 barrels of water is sufficient for most treatments. For high temperature wells, however, one batch for each 120 barrels should be used.

Oil-soluble components, if used, can be dispersed in the oil in a similar manner; that is, tanks 15–17 can be connected to the manifold 29 with a return line interconnecting the auxiliary line 39 and the tank inlets. When all of the components have been added to the liquids, the tanks 14–18 can be connected to the manifold 29 as depicted in the drawing. Prior to commencing pumping operations, the liquid levels in the tanks should be equalized. The oil tank liquid levels can be equalized merely by opening the discharge lines 24, 25, and 26. Water can be withdrawn from, or added to, the water tank 14 to bring its level in registry with the liquid level of tanks 15–17. If the liquid level in the oil tanks is greater than the liquid level in the water tank, a small amount of the oil can be transferred from the oil tanks to the water tank to equalize the levels. The water tank then should be circulated to thoroughly disperse the oil in the water. The amount of the oil added to the water tank should constitute a minor volume percent of the liquid contained therein.

Pumping operations are commenced by flowing the water from tank 14 through the manifold and introducing the oil from tanks 15–17 into the water stream at a plurality of locations provided by manifold inlets. The bulk of the stream passes through the blending equipment, to the pumps, and into the well 52. A small portion of the commingled stream in line 35 can be diverted through auxiliary line 38 returning to inlet 44 of manifold 29.

In performing the fracturing treatment, the surface equipment will be set up in the proper arrangement and the wellhead equipment pressure-tested in the usual manner. The initial volume of fracturing fluid injected into the formation, known as the pad, will generally contain a fluid loss control additive such as silica flour which can be introduced into the tub 31 through openings 41 and 42. The concentration of the fluid loss control additive can range from 10 to 50 pounds or more per 1000 gallons of the fracturing fluid. Following the injection of the pad, fluid containing suspended propping agent particles is injected into the fracture. The propping agent particles can be silica sand, glass beads, walnut hulls, plastic pellets, stell shot, and the like. The propping agent particles can be blended into the fluid through openings 41 and 43 of the tub 31. The concentration of the propping agent particles in the fracturing fluid will depend upon the type of propping desired. If a multilayer pack is desired, the concentration will generally be between about 3 and about 10 pounds per gallon of the fluid. On the other hand, if a partial monolayer pattern is desired, the concentration can be much lower, from about 1 to about 15 pounds per barrel of the fluid. The size of the propping agent particles is generally between about 6 mesh and about 60 mesh on the U. S. Standard Sieve Series, with the 20–40 mesh size being the most common. A gradation of the propping agent particle sizes can also be used if desired. The initial particles, for example, may have a 40–60 mesh size; followed by a 20–40 mesh size; and finally a 10–20 mesh size.

The following example illustrates a field application of the present invention. At the well site location, five 500-barrel tanks were connected in parallel to the suction manifold of the blending equipment. Recirculation line 68 was not used in this treatment. One tank was filled with 500 barrels of hard water and four tanks were filled with 2000 barrels of lease crude. The total hardness of the water was determined by the use of a suitable chemical measuring kit. Five hundred pounds of trisodium phosphate was added to soften the water. The water was allowed to set for one-half hour to permit the water softening chemical to react. Three 6-barrel batches of concentrated solution of fatty acid soap was prepared in the blender tub and circulated into the water tank. A total of 110 gallons of tall oil acid and 200 pounds of sodium hydroxide were used to prepare the soap. Next, 400 pounds of polacrylamide and 400 pounds of guar gum were added to the water to prepare an aqueous polymer solution. The aqueous solution containing the water-soluble additives had a pH of about 8. The liquid levels of the five tanks were equalized and the blending operations begun. The discharge rates of each of the tanks was controlled so that the tanks were emptied at about the same rate, providing a blend of 4 parts of oil to 1 part of water by volume. The agitation through the blender and the injection pumps was sufficient to form a stable oil-in-water emulsion. The appearance of the emulsion was opaque with a brownish yellow cast. During the injection operation about 560 pounds of a commercial fluid loss additive were blended into the 450 barrels of the fracturing fluid used as the pad. The rate of injection was at about 11 barrels per minute. Following the injection of the pad, the well was closed in to obtain an initial closed-in pressure which indicated that the tubing friction loss at the injection rate was about 0.24 psi per foot. It should be noted that this friction loss is less than the calculated friction loss (about 0.45 psi per foot) for plain water flowing at the same rate. Following the injection of the pad, 40–60 mesh sand was blended into the fluid to provide a concentration of three pounds per barrel of fluid. Fifty barrels of this slurry was injected down the well tubing and was followed by 100 barrels of the fracturing fluid free of any suspended solids. This in turn was followed by 500 barrels of a pad containing 630 pounds of a fluid loss control additive, and 50 barrels containing 40–60 mesh sand at a concentration of three pounds per barrel of fluid. One hundred barrels of the fracturing fluid free of any suspended solids was then pumped down the tubing. Next, 175 barrels of the fracturing fluid containing 20–40 mesh sand at a concentration of three pounds per barrel of fluid was pumped down the tubing. This was then followed with 200 barrels of the fracturing fluid containing 10–20 mesh sand at a concentration of three pounds per barrel. Finally, the fluid containing the 10–20 mesh sand was flushed through the tubing with 75 barrels of the fracturing fluid free of any suspended solids. The volume of flush fluid was carefully metered to prevent overflush. Following the injection of the fluid, the well was shut in for about 24 hours. When the well was returned to production, the fluid produced had a low viscosity, indicating that the emulsion had broken and that the polymeric thickening agent had degraded at the reservoir temperature of of about 180° F. The well cleaned up in a relatively short period of time and tested at 170 barrels of oil per day through a ¼-inch choke. Prior to the stimulation treatment the well was capable of producing only 10 barrels of oil per day.

The method for continuously mixing and injecting the liquid components in accordance with the present invention enables the fracturing operation to be expeditiously performed utilizing conventional oil field equipment.

I claim:

1. A method for the hydraulic fracturing of a subterranean formation surrounding a wellbore using an emulsified fluid which contains a minor volume proportion of a first liquid as the external phase and a major volume proportion of a second liquid as the internal phase, said method comprising the steps of passing said first liquid through an elongate conduit to establish a turbulent flow stream; continuously introducing said second liquid into said stream at a plurality of locations spaced along said conduit to provide a progressive increase in the volumetric concentration of said second liquid in said stream; continuously withdrawing said first and second liquids from said conduit as a commingled stream; and injecting said commingled stream through said wellbore and into said formation under sufficient pressure to open a fracture therein.

2. A method as defined in claim 1 and further comprising diverting a portion of said commingled stream withdrawn from said conduit into said flow stream at a location upstream of said plurality of locations.

3. A method as defined in claim 1 wherein said first liquid is an aqueous liquid and said second liquid is a hydrocarbon oil.

4. A method as defined in claim 3 wherein the hydrocarbon oil is introduced in said stream at a volumetric rate from about 2 to about 4 times the volumetric rate of said aqueous liquid passing through said conduit.

5. A method as defined in claim 1 wherein said first liquid is an aqueous polymer solution having an apparent viscosity of between about 10 and about 200 centipoises at 70° F and a shear rate of 511 reciprocal seconds, and said second liquid is a hydrocarbon oil.

6. A method for the hydraulic fracturing of a subterranean formation surrounding a wellbore, said method comprising the steps of preparing an emulsion containing a major volume proportion of a first liquid as the external phase and a minor volume proportion of a second liquid as the internal phase; passing said emulsion through a conduit to establish a flow stream; continuously introducing into said stream at a plurality of locations spaced therealong additional volumes of said second liquid to progressively increase the concentration of said second liquid in said first liquid, the final concentration of said second liquid in said first liquid being more than about 50 volume percent but not more than about 80 volume percent; and thereafter injecting said first liquid containing said second liquid through said wellbore and into said formation at a pressure sufficient to open a fracture therein.

7. A method for continuously preparing an emulsified fracturing fluid and for injecting the same into a subterranean formation surrounding a wellbore, said method comprising the steps of placing a first liquid in a first container; placing a second liquid immiscible with said first liquid in a plurality of containers; equalizing the liquid levels in all of said containers; continuously discharging said first liquid from said first container into a conduit to establish a turbulent flow stream; continuously discharging said second liquid from said plurality of containers into said flow stream at a plurality of locations spaced along said elongate conduit to progressively increase the concentration of said second liquid in said first liquid; continuously maintaining the liquid levels in said containers at about the same level while said first and second liquids are being discharged into said conduit; continuously withdrawing said first and second liquids from said conduit as a commingled stream; and continuously injecting said commingled stream through said wellbore and into said formation at a pressure sufficient to open a fracture therein.

8. A method for the hydraulic fracturing of a subterranean formation which comprises passing an aqueous liquid containing an emulsifying agent capable of forming an oil-in-water emulsion through a substantially open conduit to establish a flow stream; introducing a hydrocarbon liquid into said flow stream at a plurality of locations spaced along said conduit to progressively increase the volumetric concentration of said hydrocarbon liquid in said stream, said hydrocarbon liquid mixing with said aqueous liquid to form an oil-in-water emulsion wherein said hydrocarbon liquid comprises a major volume proportion of said emulsion; and thereafter injecting said emulsion into said formation.

9. A method for the hydraulic fracturing of a subterranean formation which comprises preparing an emulsion containing a major volume proportion of an aqueous liquid as the external phase and a minor volume proportion of a hydrocarbon liquid as the internal phase, and an emulsifying agent capable of forming an oil-in-water emulsion; flowing said emulsion through a substantially open conduit to establish a flow stream; introducing into said stream at a plurality of locations spaced along said conduit additional volumes of said hydrocarbon liquid to progressively increase the concentration of said hydrocarbon liquid to more than 50 volume percent but not more than 80 volume percent of said emulsion; and thereafter injecting said emulsion into said formation.

* * * * *